United States Patent
Flajslik et al.

(10) Patent No.: US 10,394,738 B2
(45) Date of Patent: Aug. 27, 2019

(54) TECHNOLOGIES FOR SCALABLE HIERARCHICAL INTERCONNECT TOPOLOGIES

(71) Applicant: Intel Corporation, Santa Clara, CA (US)

(72) Inventors: Mario Flajslik, Hudson, MA (US); Eric R. Borch, Fort Collins, CO (US); Michael A. Parker, Santa Clara, CA (US); Wayne A. Downer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 15/279,830

(22) Filed: Sep. 29, 2016

(65) Prior Publication Data

US 2018/0089127 A1    Mar. 29, 2018

(51) Int. Cl.
*G06F 13/40* (2006.01)
(52) U.S. Cl.
CPC ...... *G06F 13/4022* (2013.01); *G06F 13/4068* (2013.01)
(58) Field of Classification Search
None
See application file for complete search history.

(56) References Cited

U.S. PATENT DOCUMENTS

| | | | | |
|---|---|---|---|---|
| 7,139,267 B2* | 11/2006 | Lu | | H04L 45/02 370/386 |
| 2004/0010610 A1* | 1/2004 | Cypher | | G06F 12/0813 709/230 |
| 2006/0129882 A1 | 6/2006 | Taylor et al. | | |
| 2006/0184711 A1 | 8/2006 | Pettey et al. | | |
| 2008/0144619 A1 | 6/2008 | Awsienko et al. | | |
| 2013/0142203 A1* | 6/2013 | Koponen | | H04L 12/66 370/401 |
| 2014/0068049 A1* | 3/2014 | Vigneras | | H04L 41/00 709/223 |
| 2014/0245324 A1 | 8/2014 | Minkenberg et al. | | |
| 2016/0330125 A1* | 11/2016 | Mekkattuparamban | | H04L 47/20 |
| 2017/0366884 A1* | 12/2017 | Rickman | | H04Q 11/0066 |

OTHER PUBLICATIONS

Kim,J.,et al."Technology-Driven, Highly-Scalable Dragonfly Topology." 2008 International Symposiumon Computer Architecture.
International search report for PCT application No. PCT/US2017/047780, dated Nov. 15, 2017 (5 pages).
Written opinion for PCT application No. PCT/US2017/047780, dated Nov. 15, 2017 (7 pages).

* cited by examiner

*Primary Examiner* — Michael Sun
(74) *Attorney, Agent, or Firm* — Barnes & Thornburg LLP

(57) ABSTRACT

Technologies for a system of communicatively coupled network switches in a hierarchical interconnect network topology include two or more groups that each include two or more first and second level switches in which each of the first level switches are communicatively coupled to each of the plurality of second level switches to form a complete bipartite graph. Additionally, each of the groups is interconnected to each of the other groups via a corresponding global link connecting a second level switch of one group to a corresponding second level switch of another group. Further, each of the first level switches are communicatively coupled to one or more computing nodes. Other embodiments are described herein.

16 Claims, 5 Drawing Sheets

TECHNOLOGIES FOR SCALABLE HIERARCHICAL INTERCONNECT TOPOLOGIES

GOVERNMENT RIGHTS CLAUSE

This invention was made with Government support under contract number H98230A-13-D-0124 awarded by the Department of Defense. The Government has certain rights in this invention.

BACKGROUND

Demands by individuals, researchers, and enterprises (e.g., network operators and service providers) for increased compute performance and storage capacity of network computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multi-processor/multi-core network nodes connected via high-speed interconnects (e.g., fabric interconnects in a unified fabric).

As such, various network topologies (i.e., the arrangement of various elements of a network) have been developed to manage such complex large-scale computing environments, which include a number of network computing devices (e.g., routers, switches, compute/storage nodes, etc.). Multiple factors (e.g., performance, price, scalability, etc.) are typically used to determine which type of network topology, and the network computing devices thereof, is deployed for a given network. It should be appreciated that as the number of network computing devices increase, the number of connections therebetween increases, thereby increasing costs associated with the network, from both monetary and performance perspectives. Accordingly, the hierarchical topology of the network can have a positive or negative impact on the overall characteristics and performance realized by users of the network, as well as the scalability of the network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
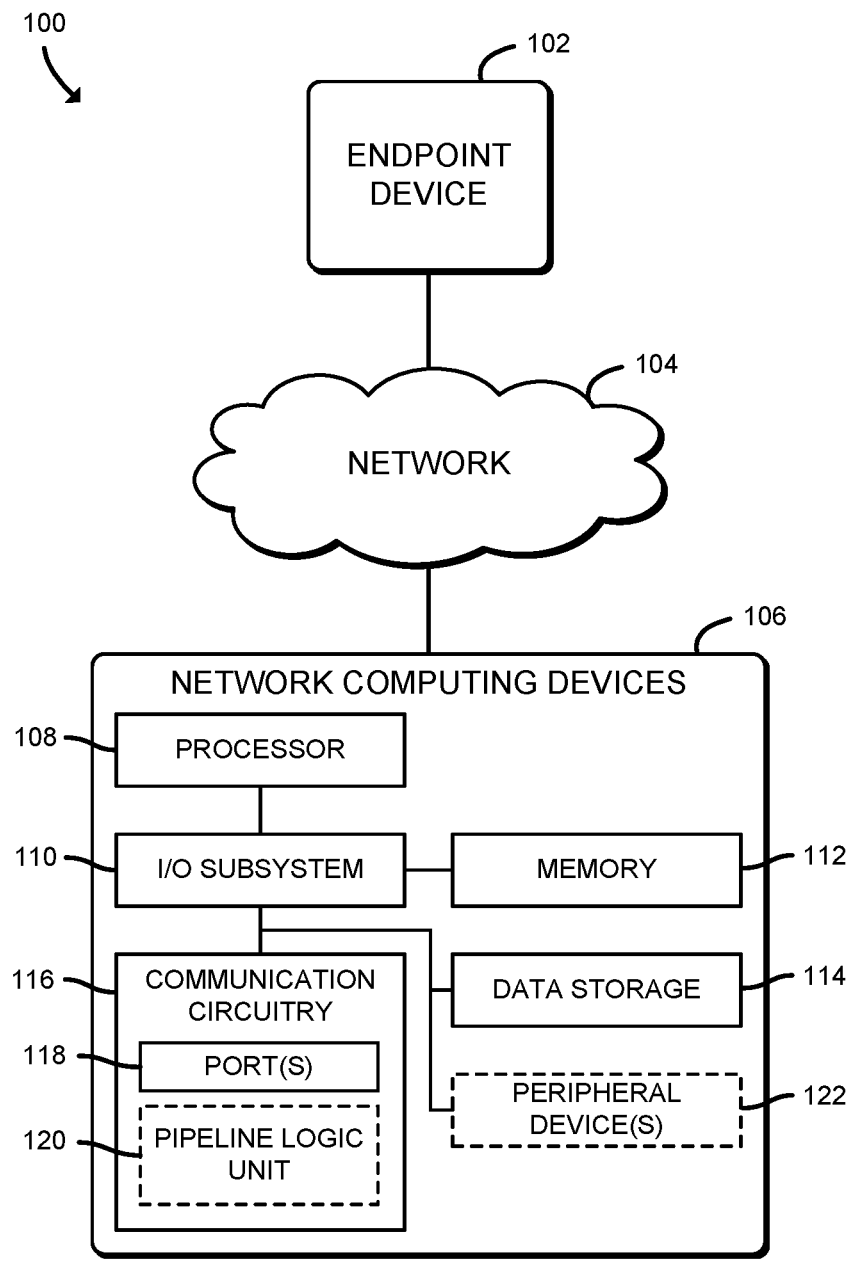
FIG. 1 is a simplified block diagram of at least one embodiment of a system for scalable hierarchical interconnect topologies.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for scalable hierarchical interconnect topologies includes an endpoint device 102 in network communication with one or more network computing devices 106 via a network 104. In use, the network computing devices 106 process network traffic (e.g., packets, frames, messages, datagrams, etc.), which are typically driven by requests received externally, such as from actions initiated by a user of the endpoint device 102 (e.g., via a networked client application executing on the endpoint device) and/or an application being executed on the endpoint device 102. For example, the network computing devices 106 may be configured to perform computations on data associated with the network traffic, such as may be required to solve complex science, engineering, and/or business problems. To do so, computing power across a portion of the network computing devices 106 is aggregated in such a way as to deliver higher performance than could be harnessed by a single network computing device 106.

As will be described in further detail below, the network computing devices 106 of the scalable hierarchical interconnect topologies described herein include multiple groups which each include two levels of network switches that are interconnected in such a topological arrangement that each group of network switches forms a complete bipartite graph (see, e.g., the group 230 of FIG. 2). In a complete bipartite graph, for any number of vertices in each disjoint set, any vertex from one disjoint set connects directly to all vertices in the other disjoint set. To form the complete bipartite graph, the scalable hierarchical interconnect topologies described herein include disjoint sets that consist of a first disjoint set of switches (e.g., the second level switches 200 of FIG. 2) and a second disjoint set of switches (e.g., the first level switches 210 of FIG. 2) connected via links (e.g., the local links 218 of FIG. 2).

Each group of network switches is globally connected to the other groups of network switches in an all-to-all fashion (i.e., the groups form a clique globally). To do so, one or more of the second level switches in one group are connected via global links (see, e.g., the global links 208 of the group 230 of FIG. 2) to one or more second level switches of the other groups. Each group additionally includes multiple nodes (see, e.g., the computing nodes 220 of the group 230 of FIG. 2) communicatively coupled via node links (see, e.g., the node links 222 of FIG. 2) to each of the first level switches.

It should be appreciated that, by nature of the bipartite graph and the placement of computing node ports and global ports usable to link the respective network computing devices 106, each computing node port is exactly one hop away from any global port. As such, the overall number of required hops to route traffic can be minimized and unified. While the illustrative topology may be classified as a diameter 3 network, it should be appreciated that additional levels (i.e., more than two) of switches can result in a larger diameter network. It should be further appreciated that, in the topology described herein, no edges (i.e., the local links 218 of FIG. 2) are "wasted" on connecting graph vertices (i.e., the first level switches 210 and the second level switches 200) within the disjoint set. As such, the size of the group can be maximized for a given switch radix, which can maximize the possible scale of the topology.

Typically, the network traffic transmitted through the hierarchical topology uses minimal and non-minimal routing via multiple virtual lanes. Unlike present hierarchical topologies requiring multiple lanes for deadlock-free minimal routing, the scalable hierarchical interconnect topologies described herein only require a single virtual lane for deadlock-free minimal routing. As such, the remaining virtual lanes may be used for quality of service purposes. It should be appreciated that, in some embodiments, additional virtual lanes may be required to avoid protocol deadlock, such as to support messaging as may be required in certain shared memory systems.

The endpoint device 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a connected system, a server (e.g., stand-alone, rack-mounted, blade, etc.), a network appliance (e.g., physical or virtual), a web appliance, a distributed computing system, a processor-based system, a multiprocessor system, and/or any other computing/communication device. It should be appreciated that, in some embodiments, endpoint device 102 may be a peer instance of the network computing device 106.

The network 104 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the endpoint device 102 and the network computing devices 106, which are not shown to preserve clarity of the description.

The network computing devices 106 may be embodied as any type of network traffic managing, processing, storing, and/or forwarding device, such as a switch (e.g., a disaggregated switch, a rack-mounted switch, a standalone switch, a fully managed switch, a partially managed switch, a full-duplex switch, and/or a half-duplex communication mode enabled switch), a compute node, a storage node, a server (e.g., stand-alone, rack-mounted, blade, etc.), an enhanced network interface controller (NIC) (e.g., a host fabric interface (HFI)), a network appliance (e.g., physical or virtual), a router, a web appliance, a distributed computing system, a processor-based system, and/or a multiprocessor system. It should be appreciated that while only a single network computing device 106 is shown in the illustrative system 100 of FIG. 1, there may be any number (e.g., hundreds, thousands, tens of thousands, etc.) of network computing devices 106.

As shown in FIG. 1, the illustrative network computing device 106 includes a processor 108, an input/output (I/O) subsystem 110, a memory 112, a data storage device 114, and communication circuitry 116. Of course, in other embodiments, the network computing device 106 may include alternative or additional components, such as those commonly found in a computing device capable of communicating with a telecommunications infrastructure (e.g., various input/output devices). Additionally, in some embodiments, one or more of the illustrative components may be incorporated in, or otherwise form a portion of, another component. For example, the memory 112, or portions thereof, may be incorporated into the processor 108, in some embodiments. Further, in some embodiments, one or more of the illustrative components may be omitted from the network computing device 106.

The processor 108 may be embodied as any type of processor capable of performing the functions described herein. For example, the processor 108 may be embodied as one or more single core processors, one or more multi-core processors, a digital signal processor, a microcontroller, or other processor or processing/controlling circuit. Similarly, the memory 112 may be embodied as any type of volatile or non-volatile memory or data storage capable of performing the functions described herein. In operation, the memory 112 may store various data and software used during operation of the network computing device 106, such as operating systems, applications, programs, libraries, and drivers.

The memory 112 is communicatively coupled to the processor 108 via the I/O subsystem 110, which may be embodied as circuitry and/or components to facilitate input/output operations with the processor 108, the memory 112, and other components of the network computing device 106. For example, the I/O subsystem 110 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 110 may form a portion of a system-on-a-chip (SoC) and be incorporated, along with the processor 108, the memory 112, and other components of the network computing device 106, on a single integrated circuit chip.

The data storage device 114 may be embodied as any type of device or devices configured for short-term or long-term storage of data such as, for example, memory devices and circuits, memory cards, hard disk drives, solid-state drives, or other data storage devices. It should be appreciated that the data storage device 114 and/or the memory 112 (e.g., the computer-readable storage media) may store various data as described herein, including operating systems, applications, programs, libraries, drivers, instructions, etc., capable of being executed by a processor (e.g., the processor 108) of the network computing device 106. It should be appreciated that, in some embodiments, the network computing device 106 may be classified as a high performance computer, or supercomputer. In such embodiments, it should be appreciated that the network computing device 106 may include more processing power (e.g., more processors 108, more processor cores, etc.) and/or more or less storage (e.g., memory 112, data storage devices 114, etc.) than a typical network computing device 106 not classified as a supercomputer.

The communication circuitry 116 may be embodied as any communication circuit, device, or collection thereof, capable of enabling communications between the network computing device 106 and other computing devices, such as other network computing devices 106, as well as any network communication enabling devices, such as an access point, network switch/router, computing node, etc., such as may be necessary to allow communication over the network 104. The communication circuitry 116 may be configured to use any one or more communication technologies (e.g., wireless or wired communication technologies) and associated protocols (e.g., InfiniBand, Omni-Path, Ethernet, Bluetooth®, Wi-Fi®, WiMAX, LTE, 5G, etc.) to effect such communication.

The illustrative communication circuitry 116 includes one or more ingress/egress ports 118 and, in some embodiments (e.g., a network switch), a pipeline logic unit 120. The one or more ports 118 (i.e., input/output ports) may be embodied as any type of network port capable of transmitting/receiving network traffic to/from the network computing device 106. Accordingly, in some embodiments, the network computing device 106 may be configured to create a separate collision domain for each of the ports 118. As such, depending on the network design of the network computing device 106 and the operation mode (e.g., half-duplex, full-duplex, etc.), it should be appreciated that each of the other network computing devices 106 connected to one of the ports 118 (e.g., via an interconnect, or link) may be configured to transfer data to any of the other network computing devices 106 at any given time, and the transmissions should not interfere, or collide.

The pipeline logic unit 120 may be embodied as any specialized device, circuitry, hardware, or combination thereof to perform pipeline logic (e.g., hardware algorithms) for performing the functions described herein. In some embodiments, the pipeline logic unit 120 may be embodied as a system-on-a-chip (SoC) or otherwise form a portion of a SoC of the network computing device 106 (e.g., incorporated, along with the processor 108, the memory 112, the communication circuitry 116, and/or other components of the network computing device 106, on a single integrated circuit chip). Alternatively, in some embodiments, the pipeline logic unit 120 may be embodied as one or more discrete processing units of the network computing device 106, each of which may be capable of performing one or more of the functions described herein. For example, the pipeline logic unit 120 may be configured to process network packets (e.g., parse received network packets, determine destination computing devices for each received network packets, forward the network packets to a particular buffer queue of a respective host buffer of the network computing device 106, etc.), perform computational functions, etc.

In some embodiments, the network computing device 106 may additionally include one or more peripheral devices 122. The peripheral devices 122 may include any number of input/output devices, user interface devices, and/or externally connected peripheral devices. For example, in some embodiments, the peripheral devices 122 may include a display, touch screen, graphics circuitry, keypad, keyboard, mouse, speaker system, and/or other input/output devices, interface devices, and/or peripheral devices. Additionally or alternatively, the peripheral devices 122 may include one or more ports (a video graphics array (VGA) port, a high-definition multimedia interface (HDMI) port, a universal serial bus (USB) port, an audio port, etc.) for connecting external peripheral devices to the network computing device 106.

Figure 2:
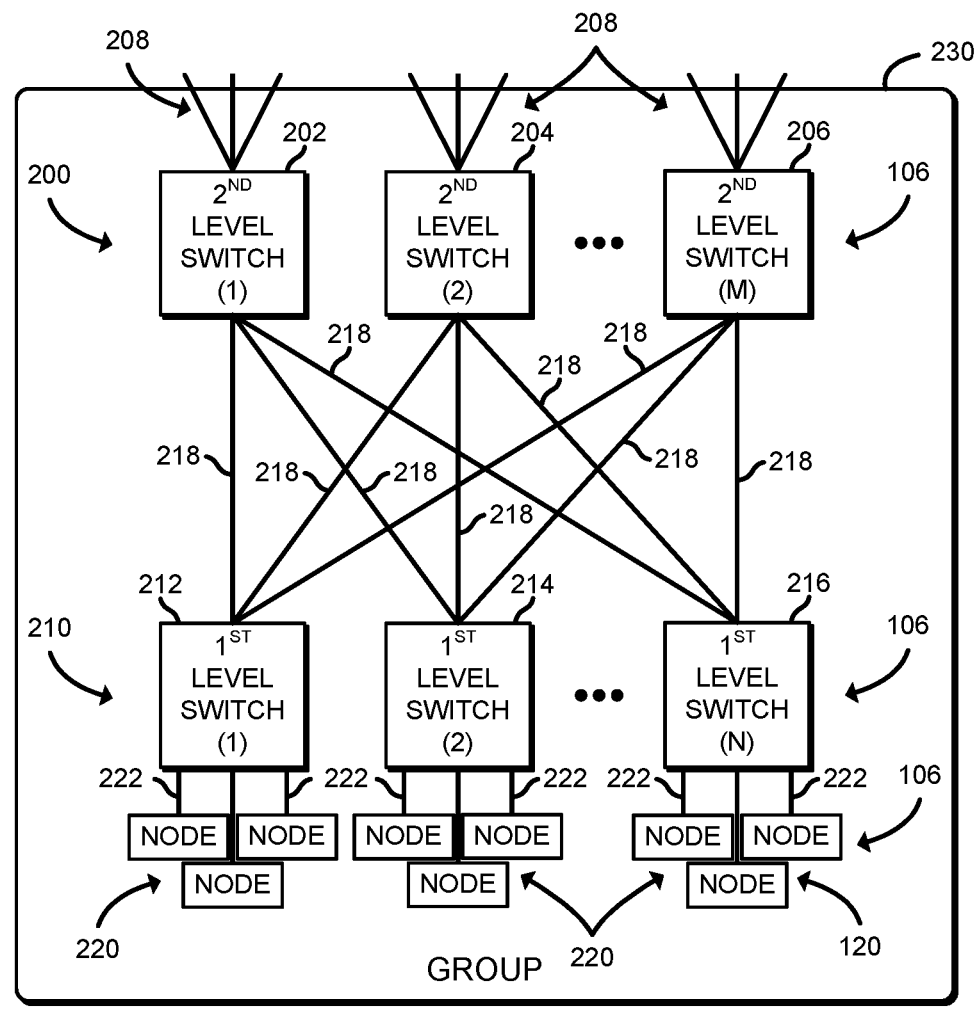
FIG. 2 is a simplified block diagram of at least one embodiment of a group of network computing devices of the system of FIG. 1 in a two-level hierarchical interconnect topology that includes a first level of switches, a second level of switches, and multiple computing nodes.

Referring now to FIG. 2, an illustrative group 230 includes a set of first level switches 210 and a set of second level switches 200 configured in the hierarchical topology described herein (i.e., a complete bipartite graph). The illustrative second level switches 200 include a first second level switch, which is designated as $2^{nd}$ level switch (1) 202, a second second level switch, which is designated as $2^{nd}$ level switch (2) 204, and a third second level switch, which is designated as $2^{nd}$ level switch (M) 206 (i.e., the "Mth" second level switch of the group 230, wherein "M" is a positive integer and designates one or more additional second level switches of the group 230). Similarly, the illustrative first level switches 210 include a first first level switch, which is designated as $1^{st}$ level switch (1) 212, a second first level switch, which is designated as $1^{st}$ level switch (2) 214, and a third first level switch, which is designated as 1st level switch (N) 216 (i.e., the "Nth" first level switch of the group 230, wherein "N" is a positive integer and designates one or more additional first level switches of the group 230).

In some embodiments, the first level switches 210 and second level switches 200 may be the same type of switch, differing by which network computing device 106 is connected to them. In other words, the same type of switch may be used regardless of whether the switch is deployed as a first level switch 210 connected to a second level switch 200 and computing node 220, or if the switch is deployed as a second level switch 200 connected to a first level switch 210 and a different second level switch 200. It should be appreciated that, in some embodiments, there may be an equal amount of first level switches 210 and second level switches 200; while in other embodiments, there may be a greater or fewer amount of second level switches 200 than first level switches 210. It should be further appreciated that, while the embodiment of FIG. 2 includes first level switches 210 and second level switches 200, other hierarchical topology embodiments may include more than two levels of switches.

The illustrative group 230 additionally includes multiple connectors, or links, of the hierarchical topology. The multiple links include a set of global links 208, a set of local links 218, and a set of node links 222. The global links 208 are configured to communicatively couple each of the second level switches 200 to a second level switch 200 of at least one other group 230 (see, e.g., the global links 208 of FIG. 3). It should be appreciated that, in some embodiments, one or more of the second level switches 200 may only connect to the first level switches of the group 230 (i.e., no global links 208 connected thereto), such as may be done to increase local (i.e., intra-group 208) bandwidth. The local links 218 are configured to communicatively couple the first level switches 210 with the second level switches 200 in each group 230. The node links 222 are configured to communicatively couple each of the first level switches 210 to one or more computing nodes 220 (e.g., compute nodes, storage nodes, etc.).

Figure 3:
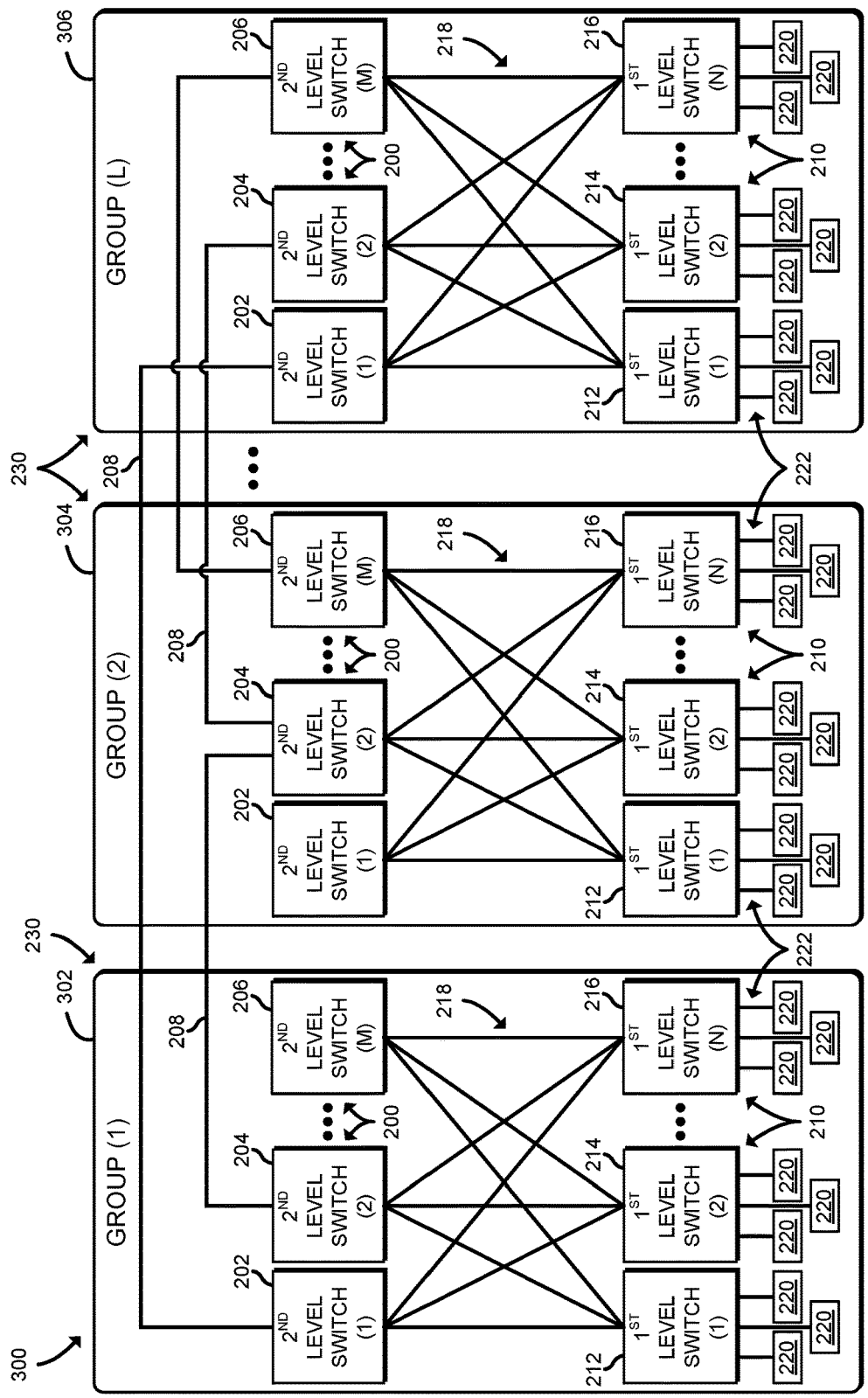
FIG. 3 is a simplified block diagram of at least one embodiment of multiple groups of FIG. 2 in a two-level hierarchical interconnect topology.

Referring now to FIG. 3, an illustrative interconnected group 300 includes a series of interconnected groups 230. The illustrative interconnected group 300 includes a first group, which is designated as group (1) 302, a second group, which is designated as group (2) 304, and a third group, which is designated as group (L) 306 (i.e., the "Lth" group of the interconnected group 300, wherein "L" is zero or a positive integer and designates zero or more additional groups 230 of the interconnected group 300). As described previously, each of the groups 230 of the interconnected group 300 are connected to each of the other groups 230 of the interconnected group 300 via the global links 208. It should be appreciated that, while only a single second level switch 200 is illustratively coupled to one other second level switch 200 in each group 230, in other embodiments each of the second level switches 200 from each group 230 may be communicatively coupled to more than one of the second level switches 200 of the other groups 230 of the interconnected group 300.

Figure 4:
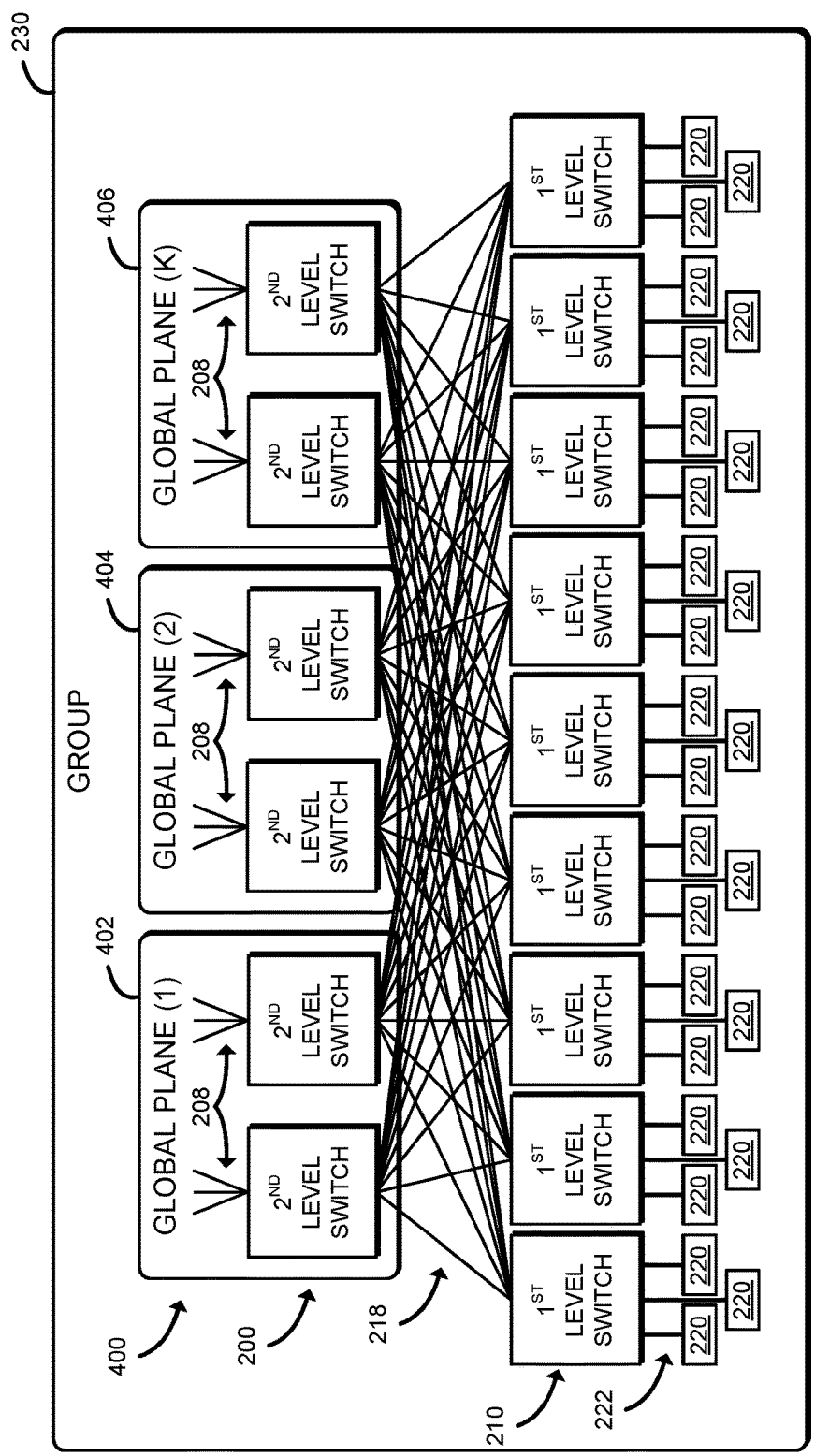
FIG. 4 is a simplified block diagram of at least one embodiment of the group of FIG. 2 segregated into multiple global planes in a balanced taper.

Referring now to FIG. 4, an illustrative group 230 includes the second level switches 200 of the group 230 segregated into multiple (i.e., two or more) global planes 400. As shown, each of the global planes 400 includes more than one second level switch 200; however, it should be appreciated that, in some embodiments, a single second level switch 200 may be deployed in a global plane 400. The illustrative global planes 400 includes a first global plane, which is designated as global plane (1) 402, a second global plane, which is designated as global plane (2) 404, and a third global plane, which is designated as global plane (K) 406, wherein K is zero or a positive integer and designates zero or more additional global planes. Such a topological segregation of the second level switches 200 (i.e., a global taper) can allow for fewer global connections between each group pair (i.e., redundant connections may be removed). It should be appreciated that each of the global planes 400 will have connectivity to all of the other interconnected groups to which the group 230 is connected; however, it should be further appreciated that the connectivity would stay within the respective global plane 400. For example, all of the global links 208 in global plane (1) 402 of one group 230 connect to the same respective global plane (1) 402 in all the other groups 230 of the interconnected group (e.g., the interconnected group 300 of FIG. 3).

While the illustrative group 230 of multiple global planes 400 is comprised of fewer second level switches 200 than first level switches 210 (i.e., a balanced taper), it should be appreciated that the number of first level switches 210 may be equal to or less than the number of second level switches 200, in other embodiments. However, it should be appreciated that in such balanced taper embodiments as shown in FIG. 4, the reduced number of second level switches 200 also reduces the number of local links and global links, while the ratio of local and global links remains balanced. It should be further appreciated that in balanced taper embodiments in which the global tapering results in more than one second level switch 200 without any global links 208, pairs of such second level switches 200 can be merged into one switch with all local links 218, thereby reducing the number of second level switches 200 while preserving all of the local links 218. Alternatively, in some embodiments, the links to the same destination for multiple global planes 400 may be merged and implemented via a single cable.

In an illustrative embodiment, each of the first level switches and second level switches 200 are embodied as 64-port switches (i.e., each of the switches includes 64 ports). In such an embodiment, roughly one million nodes (e.g., one million of the computing nodes 220) can be supported, with each node having a single path. It should be appreciated that, if multiple paths to the nodes are to be supported, the maximum number of supported nodes will be reduced. For example, to support two paths, roughly 500,000 nodes can be supported. Similarly, to support five paths, a node system with roughly 200,000 nodes can be supported. Accordingly, in such embodiments, each of the paths may be grouped into its own global plane 400.

Figure 5:
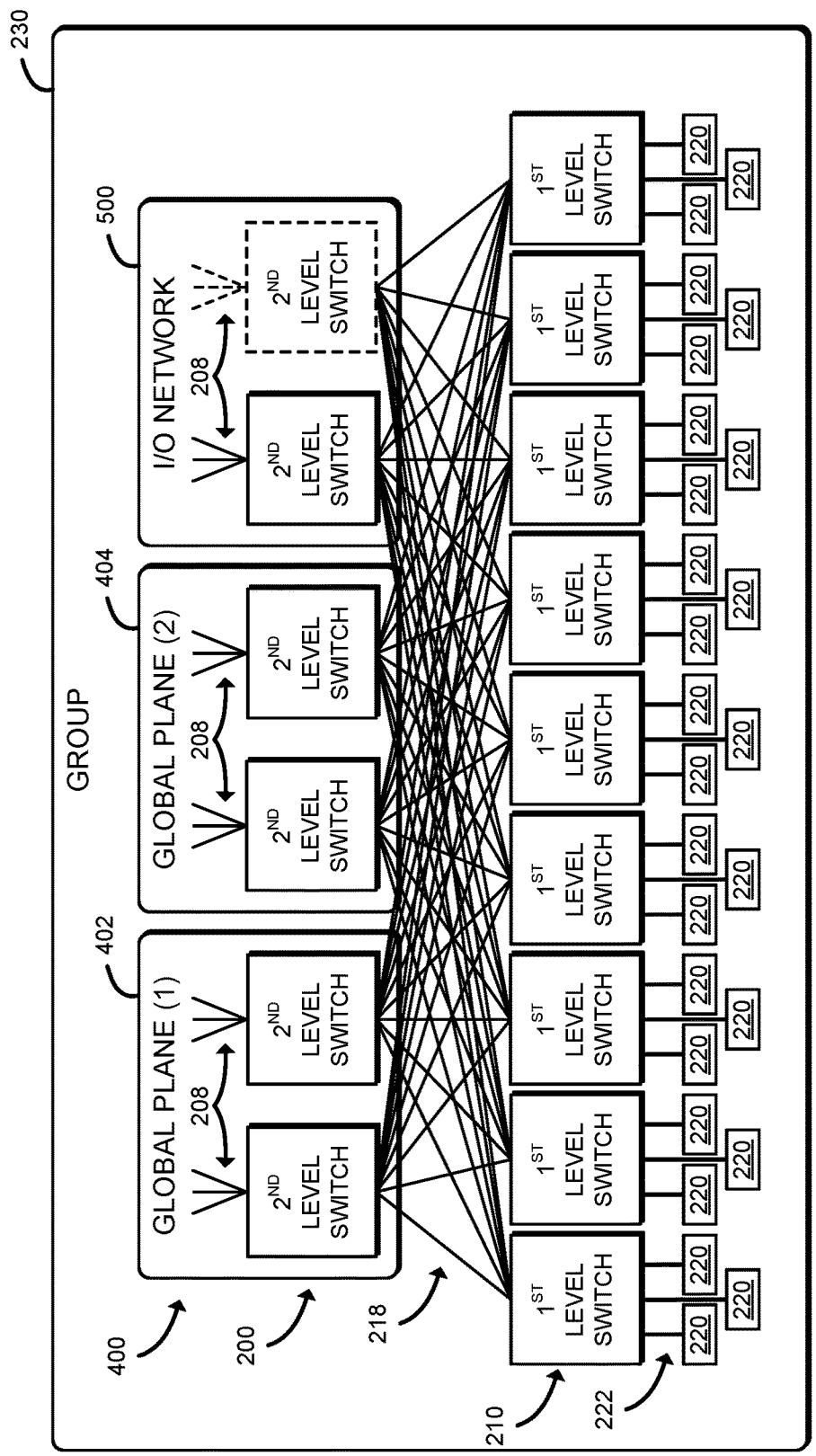
FIG. 5 is a simplified block diagram of at least one embodiment of the group of FIG. 2 segregated into multiple global planes and an input/output (I/O) network.

Referring now to FIG. 5, an illustrative group 230 includes multiple global planes 400 of FIG. 4, as well as an I/O network 500. In such embodiments, the I/O network 500 can be connected through one or more dedicated second level switches 200 with I/O and global links. Accordingly, in such embodiments, I/O operations may be isolated from compute operations.

EXAMPLES

Illustrative examples of the technologies disclosed herein are provided below. An embodiment of the technologies may include any one or more, and any combination of, the examples described below.

Example 1 includes a system of communicatively coupled network switches in a hierarchical interconnect network topology, the system comprising a plurality of groups, each of the plurality of groups comprising a plurality of computing nodes; and a plurality of interconnecting links, wherein the plurality of interconnecting links include one or more global links, local links, and node links; a plurality of switches, wherein the plurality of switches includes a plurality of second level switches; and a plurality of first level switches, wherein each of the plurality of first level switches is communicatively coupled to each of the plurality of second level switches via a corresponding local link, and wherein each of the plurality of first level switches are communicatively coupled to each of one or more of the plurality of computing nodes via a corresponding node link, wherein each of the plurality of groups is interconnected to each of the other of the plurality of groups via a corresponding global link connected to a second level switch of one of the plurality of groups and a corresponding second level switch of another of the plurality of groups.

Example 2 includes the subject matter of Example 1, and wherein the number of first level switches is equal to the number of second level switches.

Example 3 includes the subject matter of any of Examples 1 and 2, and wherein the number of first level switches is greater than the number of second level switches.

Example 4 includes the subject matter of any of Examples 1-3, and wherein the number of first level switches is less than the number of second level switches.

Example 5 includes the subject matter of any of Examples 1-4, and wherein each of the first level switches and second level switches includes 64 ports.

Example 6 includes the subject matter of any of Examples 1-5, and wherein the interconnection of each of the first and second level switches for each group forms a complete bipartite graph.

Example 7 includes the subject matter of any of Examples 1-6, and wherein each of the plurality of groups further includes a plurality of global planes, wherein each of the plurality of global planes includes at least a portion of the second level switches.

Example 8 includes the subject matter of any of Examples 1-7, and wherein the total number of global planes is equal to the total number of paths to each computing node.

Example 9 includes the subject matter of any of Examples 1-8, and wherein one or more of the plurality of groups further includes an input/output (I/O) network, wherein the I/O network includes one or more of the second level switches, and wherein the I/O network is usable to isolate I/O operations from the compute operations.

Example 10 includes a method for communicatively coupling network switches in a hierarchical interconnect network topology, the method comprising connecting one or more computing nodes of a group of a plurality of groups to each of a corresponding one of a plurality of first level switches of the group via a corresponding node link; connecting each of the first level switches to each of a plurality of second level switches of the group via a corresponding local link; and connecting one or more of the plurality of second level switches to a corresponding second level switch of another group of the plurality of groups via a corresponding global link.

Example 11 includes the subject matter of Example 10, and wherein connecting each of the first level switches to each of the plurality of second level switches comprises connecting a number of first level switches to an equal number of second level switches.

Example 12 includes the subject matter of any of Examples 10 and 11, and wherein connecting each of the first level switches to each of the second level switches comprises connecting an amount of first level switches to a greater amount of second level switches.

Example 13 includes the subject matter of any of Examples 10-12, and wherein connecting each of the first level switches to each of the second level switches comprises connecting an amount of first level switches to a lesser amount of second level switches.

Example 14 includes the subject matter of any of Examples 10-13, and wherein connecting each of the first level switches to each of the second level switches comprises connecting first level switches that include 64 ports to second level switches that include 64 ports.

Example 15 includes the subject matter of any of Examples 10-14, and wherein connecting each of the first level switches to each of the second level switches forms a complete bipartite graph.

Example 16 includes the subject matter of any of Examples 10-15, and further comprising segregating each of the plurality of groups further into a plurality of global planes, wherein each of the plurality of global planes includes at least a portion of the second level switches.

Example 17 includes the subject matter of any of Examples 10-16, and wherein the total number of global planes is equal to the total number of paths to each computing node.

Example 18 includes the subject matter of any of Examples 10-17, and further comprising connecting one or more of the plurality of second level switches to a corresponding second level switch an input/output (I/O) network to isolate I/O operations from the compute operations.

The invention claimed is:

1. A system of communicatively coupled network switches in a hierarchical interconnect network topology, the system comprising:
a plurality of groups, each of the plurality of groups comprising:
a plurality of computing nodes; and
a plurality of interconnecting links, wherein the plurality of interconnecting links include one or more global links, local links, and node links;
a plurality of switches, wherein the plurality of switches includes:
a plurality of second level switches; and
a plurality of first level switches, wherein each of the plurality of first level switches is directly coupled to each of the plurality of second level switches via a corresponding local link such that the plurality of first level switches, the plurality of second level switches, and the local links form a complete bipartite graph, and wherein each of the plurality of first level switches are communicatively coupled to each of one or more of the plurality of computing nodes via a corresponding node link,
wherein each of the plurality of groups is interconnected to each of the other of the plurality of groups via a corresponding global link connected to a second level switch of one of the plurality of groups and a corresponding second level switch of another of the plurality of groups.

2. The system of claim 1, wherein the number of first level switches is equal to the number of second level switches.

3. The system of claim 1, wherein the number of first level switches is greater than the number of second level switches.

4. The system of claim 1, wherein the number of first level switches is less than the number of second level switches.

5. The system of claim 1, wherein each of the first level switches and second level switches includes 64 ports.

6. The system of claim 1, wherein each of the plurality of groups further includes a plurality of global planes, wherein each of the plurality of global planes includes at least a portion of the second level switches.

7. The system of claim 6, wherein the total number of global planes is equal to the total number of paths to each computing node.

8. The system of claim 6, wherein one or more of the plurality of groups further includes an input/output (I/O) network, wherein the I/O network includes one or more of the second level switches, and wherein the I/O network is usable to isolate I/O operations from the compute operations.

9. A method for communicatively coupling network switches in a hierarchical interconnect network topology, the method comprising:
connecting one or more computing nodes of a group of a plurality of groups to each of a corresponding one of a plurality of first level switches of the group via a corresponding node link;
directly connecting each of the first level switches to each of a plurality of second level switches of the group via a corresponding local link such that the plurality of first level switches, the plurality of second level switches, and the local links form a complete bipartite graph; and
connecting one or more of the plurality of second level switches to a corresponding second level switch of another group of the plurality of groups via a corresponding global link.

10. The method of claim 9, wherein connecting each of the first level switches to each of the plurality of second level switches comprises connecting a number of first level switches to an equal number of second level switches.

11. The method of claim 9, wherein connecting each of the first level switches to each of the second level switches comprises connecting an amount of first level switches to a greater amount of second level switches.

12. The method of claim 9, wherein connecting each of the first level switches to each of the second level switches comprises connecting an amount of first level switches to a lesser amount of second level switches.

13. The method of claim 9, wherein connecting each of the first level switches to each of the second level switches comprises connecting first level switches that include 64 ports to second level switches that include 64 ports.

14. The method of claim 9, further comprising segregating each of the plurality of groups further into a plurality of global planes, wherein each of the plurality of global planes includes at least a portion of the second level switches.

15. The method of claim 14, wherein the total number of global planes is equal to the total number of paths to each computing node.

16. The method of claim 14, further comprising connecting one or more of the plurality of second level switches to a corresponding second level switch an input/output (I/O) network to isolate I/O operations from the compute operations.

* * * * *